United States Patent
Mukai et al.

(10) Patent No.: US 8,035,733 B2
(45) Date of Patent: Oct. 11, 2011

(54) LENS BARREL ROTATION DETECTION APPARATUS AND LENS BARREL ROTATION TYPE IMAGE PICKUP APPARATUS

(75) Inventors: Takanori Mukai, Tokyo (JP); Fumito Kageura, Kanagawa (JP); Masami Yoshioka, Kanagawa (JP); Toshihide Nakane, Kanagawa (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 12/203,341

(22) Filed: Sep. 3, 2008

(65) Prior Publication Data
US 2009/0059060 A1 Mar. 5, 2009

(30) Foreign Application Priority Data

Sep. 4, 2007 (JP) ................................ P2007-229554

(51) Int. Cl.
*H04N 5/225* (2006.01)
*H04N 5/232* (2006.01)

(52) U.S. Cl. ................. 348/373; 348/219.1; 348/211.14

(58) Field of Classification Search .................. 348/373, 348/374, 219.1, 143, 14.01, 207.99, 208.3, 348/211.13, 211.14, 347
See application file for complete search history.

(56) References Cited

U.S. PATENT DOCUMENTS

| | | | | |
|---|---|---|---|---|
| 5,331,154 A * | 7/1994 | Kondo et al. | ............ | 250/231.17 |
| 2007/0115365 A1* | 5/2007 | Sato | ........................ | 348/211.99 |
| 2007/0257990 A1* | 11/2007 | Hayashi | .................... | 348/211.99 |

FOREIGN PATENT DOCUMENTS

| | | |
|---|---|---|
| JP | 62-55511 | 3/1987 |
| JP | 2-161312 | 6/1990 |
| JP | 5 11163 | 1/1993 |
| JP | 5-272989 | 10/1993 |
| JP | 6-109197 | 4/1994 |
| JP | 6-234366 | 8/1994 |
| JP | 2001 324664 | 11/2001 |
| JP | 2007-121575 | * 5/2007 |

* cited by examiner

*Primary Examiner* — Nhan T Tran
(74) *Attorney, Agent, or Firm* — Frommer Lawrence & Haug LLP; William S. Frommer

(57) ABSTRACT

A lens barrel rotation detection apparatus for detecting a rotational state of a lens barrel to which a lens for image pickup is attached and which is rotated in a horizontal direction or a vertical direction by driving force of a driving section, includes: a single rotatable member rotatable together with rotation of the lens barrel; and three rotation detection section for detecting a rotational state of the rotatable member. The rotatable member has a fixed pattern formed thereon so as to be detected by said rotation detection section and a rotation limit section indicative of limit positions of a range of rotation of the lens barrel. The rotation detection section is disposed for detection of presence or absence of rotation of the rotatable member and the limit positions of the range of rotation.

5 Claims, 9 Drawing Sheets

LENS BARREL ROTATION DETECTION APPARATUS AND LENS BARREL ROTATION TYPE IMAGE PICKUP APPARATUS

CROSS REFERENCES TO RELATED APPLICATIONS

The present invention contains subject matter related to Japanese Patent Application JP 2007-229554 filed in the Japan Patent Office on Sep. 4, 2007, the entire contents of which being incorporated herein by reference.

BACKGROUND OF THE INVENTION

1. Field of the Invention

This invention relates to a lens barrel rotation detection apparatus and a lens barrel rotation type image pickup apparatus wherein a rotational state of a lens barrel to which a lens for image pickup apparatus is attached and which is rotated in a horizontal direction or a vertical direction by driving force of a driving source is detected.

2. Description of the Related Art

For example, a video camera for a videoconference and a security video camera are known as lens barrel rotation type image pickup apparatus wherein the lens barrel rotates. Video cameras of the type mentioned are configured from applications thereof such that the lens barrel can rotate in a horizontal direction (hereinafter referred to as panning direction) and a vertical direction (hereinafter referred to as tilting direction). In particular, the lens barrel is mounted for rotation in a panning direction and a tilting direction toward an image pickup subject so that the image pickup subject can be captured at the center of a picked up image. Further, a rotational state of the lens barrel, that is, presence or absence of rotation of the lens barrel and a limit position of a range of rotation, can be detected.

In related art, as rotational driving mechanisms for a panning direction or a tilting direction, those of the direct type and those of the speed reduction type are known. In a rotational driving mechanism of the direct type, a driving motor, that is, a driving source, which exerts rotational driving force, is connected directly to a pedestal which is rotatable together with the lens barrel supported thereon without including a speed reduction mechanism formed from gear wheels or the like. On the other hand, in a rotational driving mechanism of the speed reduction type, a plurality of plain gear wheels and so forth are combined to transmit driving force of the driving motor while reducing the speed of rotation of the driving motor so that the lens barrel can be driven to rotate even if the lens barrel is large and heavy. Further, of whichever one of the direct type and the speed reduction type the rotational driving mechanism is, it includes a lens barrel rotation detection apparatus for detecting a rotational state of the lens barrel, that is, presence or absence of rotation of the lens barrel and a limit position of a range of rotation.

Incidentally, an image pickup apparatus having a zoom function includes a zoom position detection apparatus for detecting a limit position of a zoom range. The zoom position detection apparatus can detect a moved position of the lens when the focal distance of the lens is varied by electric driving operation. To this end, the zoom position detection apparatus includes a comb-shaped rotational member for rotating together with rotation of a focus ring or a zoom motor and two photo-couplers for detecting the rotational state of the rotational member. The moved state of the lens, that is, presence or absence of rotation of the focus ring or the zoom motor and a limit position of the range of rotation, are detected from an output pattern of the two photo-couplers which varies depending upon whether light beams emitted from light emitting members of the photo-couplers are intercepted by or are transmitted between the teeth of the comb-shaped rotational member, that is, depending upon whether the light receiving member of each of the photo-couplers is placed into a no-light receiving state or a light receiving state. A zoom position detection apparatus of the type described is disclosed, for example, in Japanese Patent Laid-Open No. Hei 5-11163 (hereinafter referred to as Patent Document 1) or Japanese Patent Laid-Open No. 2001-324664 (hereinafter referred to as Patent Document 2).

Although both of Patent Document 1 and Patent Document 2 are directed not to a lens barrel rotation detection apparatus but to a zoom position detection apparatus, since the apparatus of both documents can detect presence or absence of rotation of a focus ring or a zoom motor or a limit position of a range of rotation, it is considered possible to apply the apparatus to a lens barrel rotation detection apparatus if a similar rotational member and similar photo-couplers are used. For example, if a comb-shaped rotational member which rotates together with rotation of a lens barrel is used and the rotational state of the rotational member, that is, presence or absence of rotation of the rotational member and a limit position of a range of the rotation, are detected by two photo-couplers, then rotation of the lens barrel can be detected.

SUMMARY OF THE INVENTION

However, if the technique of Patent Document 1 or Patent Document 2 is applied to configure a lens barrel rotation detection apparatus, then the reliability of detection becomes an issue. In particular, according to the technique of Patent Document 1 or Patent Document 2, the number of the "High" levels or "Low" levels of the output pattern of two photo-couplers is counted to calculate the rotational position. Therefore, if the output pattern of the photo-couplers is influenced by external noise and so forth such that, for example, the output of any one of the two photo-couplers which should exhibit the "Low" level exhibits the "High" level, then the detected or calculated rotational position becomes different from the correct position and is wrong. As a result, even if the lens barrel rotates to or beyond a limit position of the range of rotation thereof, the rotation may not stop, and this may result in failure or the like.

Therefore, it may seem a possible idea to provide two comb-shaped rotational members concentrically with each other and combine one of the rotational members with photo-couplers to detect presence or absence of rotation of the lens barrel while the other rotational member is combined with different photo-couplers to detect a limit position of a range of rotation of the lens barrel. If this configuration is adopted, then a limit position of the range of rotation of the lens barrel can be detected without relying upon counting of the output patterns of the photo-couplers, that is, counting of the number of the "High" levels or the "Low" levels. Therefore, the reliability in detection is improved.

However, where two rotational members are provided concentrically, a great space sufficient to accommodate the two rotational members in two lines is required, and the size of the lens barrel rotation detection apparatus increases. Therefore, miniaturization or freedom in design of an image pickup apparatus is disturbed. Further, since two rotational members of different shapes are required, this makes an issue also in terms of the cost such as the production cost of a metal mold for molding complicated comb-shaped rotational members and the productivity such as the man-hours for arranging the rotational members in two lines.

Therefore, it is demanded to provide a lens barrel rotation detection apparatus whose reliability in detection is improved such that the rotational state of a lens barrel such as presence or absence of rotation of the lens barrel and a limit position of a range of rotation of the lens barrel can be detected accurately while preventing increase in scale. Also it is demanded to provide a lens barrel rotation type image pickup apparatus whose reduction in scale can be implemented.

According to an embodiment of the present invention, there is provided a lens barrel rotation detection apparatus for detecting a rotational state of a lens barrel to which a lens for image pickup is attached and which is rotated in a horizontal direction or a vertical direction by driving force of a driving section. The lens barrel rotation detection apparatus includes a single rotatable member rotatable together with rotation of the lens barrel, and three rotation detection sections for detecting a rotational state of the rotatable member. The rotatable member having a fixed pattern formed thereon so as to be detected by the rotation detection section and a rotation limit section indicative of limit positions of a range of rotation of the lens barrel. The rotation detection sections are disposed for detection of presence or absence of rotation of the rotatable member and the limit positions of the range of rotation.

In the lens barrel rotation detection apparatus, each of the rotation detection section is a photo-coupler including a light emitting member and a light receiving member. The rotatable member is a rotation detection ring on which light transmitting portions which transmit light emitted from the light emitting members therethrough and light intercepting portions which intercept the light emitted from the light emitting members are disposed alternately at a fixed distance. The rotation limit section is a shutter configured to intercept the light emitted from the light emitting members at a position different from those of the light intercepting portions.

In the lens barrel rotation detection apparatus, the rotation detection sections are three photo-couplers each including a light emitting member and a light receiving member. The rotatable member is a rotation detection ring on which light transmitting portions which transmit light emitted from the light emitting members therethrough and light intercepting portions which intercept the light emitted from the light emitting members are disposed alternately at a fixed distance. The rotation limit section is a shutter which closes up some of the light transmitting portions to intercept the light emitted from the light emitting members. A limit position of a range of rotation in one direction of the rotation detection ring is detected when the light receiving portion of a first one of the three photo-couplers is in a light receiving state and the light receiving portions of second and third ones of the three photo-couplers are in a no-light receiving state. A limit position of the range of rotation in the other direction of the rotation detection ring is detected when the light receiving portion of the first photo-coupler is in a no-light receiving state and the light receiving portions of the second and third photo-couplers are in a light receiving state.

In the lens barrel rotation detection apparatus, the rotation detection sections are three photo-couplers each including a light emitting member and a light receiving member. The rotatable member is a rotation detection ring on which light transmitting portions which transmit light emitted from the light emitting members therethrough and light intercepting portions which intercept the light emitted from the light emitting members are disposed alternately for each $\theta°$ with respect to the center of rotation. The rotation limit section is a shutter which closes up some of the light transmitting portions to intercept the light emitted from the light emitting members. First and second ones of the three photo-couplers are disposed at a distance of $(2\theta + \theta/2))°$ with respect to the center of rotation of the rotation detection ring. The second and third ones of the three photo-couplers are disposed at a distance of $(2\theta - (\theta/2))°$ with respect to the center of rotation of the rotation detection ring.

According to another embodiment of the present invention, there is provided a lens barrel rotation type image pickup apparatus including a lens barrel having a lens for image pickup attached thereto, a driving source configured to exert driving force for driving the lens barrel in a horizontal direction or a vertical direction, and a lens barrel rotation detection apparatus configured to detect a rotational state of the lens barrel. The lens barrel rotation detection apparatus includes a single rotatable member rotatable together with rotation of the lens barrel and three rotation detection sections configured to detect a rotational state of the rotatable member. The rotatable member has a fixed pattern formed thereon so as to be detected by the rotation detection section and a rotation limit section indicative of limit positions of a range of rotation of the lens barrel. The rotation detection sections are disposed for detection of presence or absence of rotation of the rotatable member and the limit positions of the range of rotation.

In the lens barrel rotation detection apparatus and the lens barrel rotation type image pickup apparatus, the lens barrel rotation detection apparatus includes a single rotatable member rotatable together with rotation of the lens barrel and three rotation detection sections for detecting a rotational state of the rotatable member. The rotatable member has a fixed pattern formed thereon so as to be detected by the rotation detection section and a rotation limit section indicative of limit positions of a range of rotation of the lens barrel. The rotation detection sections are disposed for detection of presence or absence of rotation of the rotatable member and the limit positions of the range of rotation. In particular, the fixed pattern and the rotation limit section are formed on the rotatable member which rotates together with rotation of the lens barrel, and the three rotation detection sections are disposed for such a single rotation member as just described. Consequently, presence or absence of rotation and the limit positions of the range of rotation of the rotatable member can be detected.

With the lens barrel rotation detection apparatus and the lens barrel rotation type image pickup apparatus, since the fixed pattern is formed on the rotatable member, presence or absence of rotation of the rotatable member can be detected by detecting the pattern by means of the rotation detection section. Further, the limit positions of the range of rotation of the lens barrel can be detected accurately by the rotation limit section formed on the rotatable member. Furthermore, since presence or absence of rotation and the limit positions of the range of the rotation can be detected by the single rotation member, the size of the lens barrel rotation detection apparatus does not become large, and miniaturization of the lens barrel rotation type image pickup apparatus can be anticipated.

DETAILED DESCRIPTION OF THE PREFERRED EMBODIMENTS

In the following, a preferred embodiment of the present invention is described with reference to the accompanying drawings.

In the embodiment described below, the lens barrel rotation type image display apparatus according to an embodiment of the present invention is formed as a video camera 10 for a videoconference. In the video camera 10 of the present embodiment, a lens barrel 40 is rotated in a panning direction and a tilting direction so as to direct a lens 41 toward an image pickup subject so that an image of HD (High Definition) of the image pickup subject can be picked up.

Figure 1:
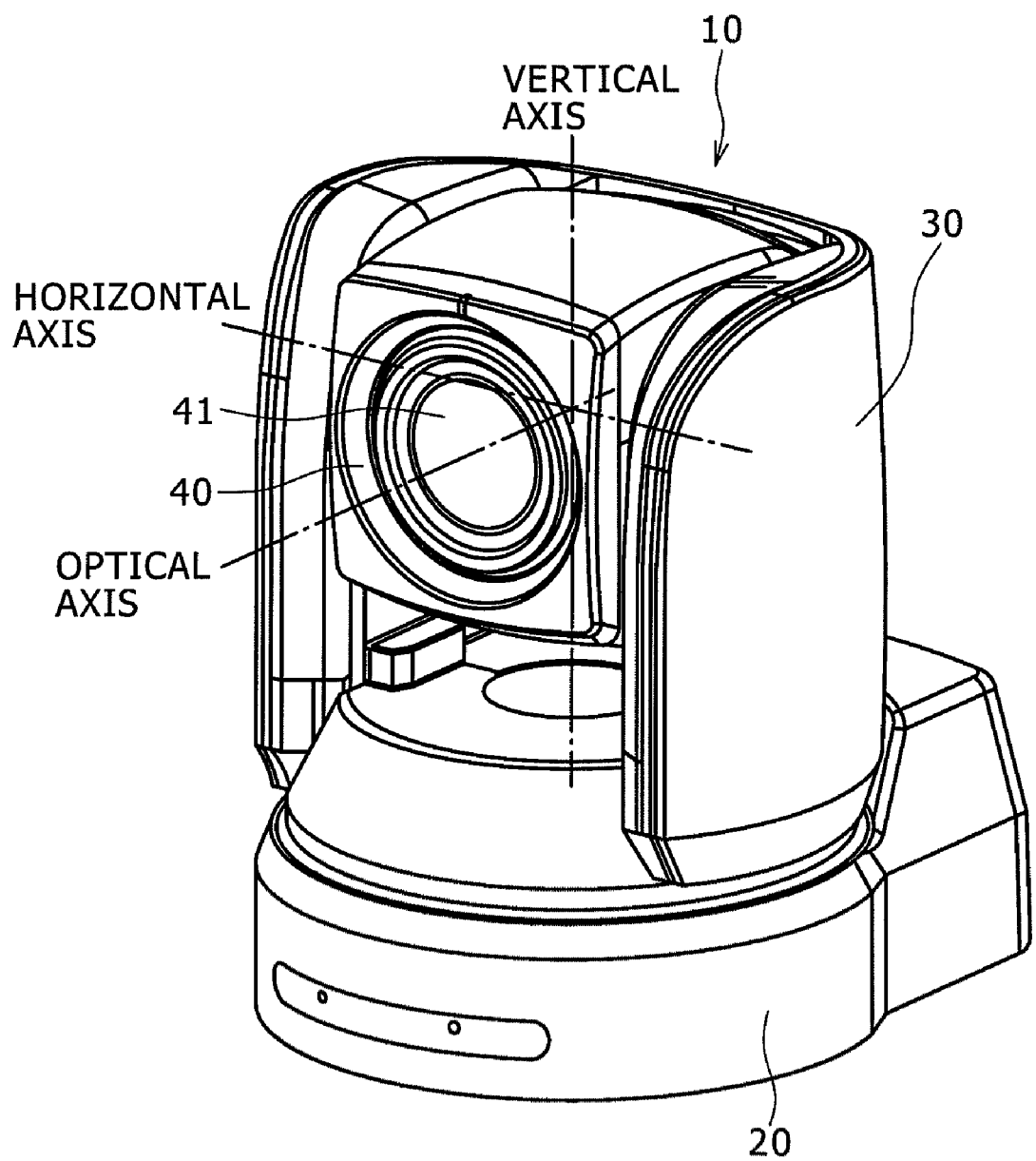
FIG. 1 is a perspective view showing a video camera to which an embodiment of the present invention is applied.

Referring first to FIG. 1, the video camera 10 of the present embodiment is shown in a perspective view.

The video camera 10 is installed in a conference room or the like through a base pedestal 20 such that it can be used in a teleconference or the like. In particular, the base pedestal 20 supports a rotatable pedestal 30 for rotation. Meanwhile, the rotatable pedestal 30 supports the lens barrel 40 for rotation. The lens 41 for image pickup and associated members are attached to the lens barrel 40. Therefore, if the rotatable pedestal 30 is rotated until the optical axis of the lens 41 is directed toward a participant in the conference or the like to pick up an image, then a teleconference or the like can be held.

Here, if the base pedestal 20 is installed horizontally, then the rotatable pedestal 30 rotates in a panning direction around a rotational center axis provided by a vertical axis illustrated in FIG. 1. Therefore, the lens 41 can be directed toward any one of participants seated around a conference table or the like. It is to be noted that, in this instance, since the vertical axis which is the rotational center axis of the rotatable pedestal 30 intersects with the optical axis of the lens 41, even if the lens barrel 40 rotates together with rotation of the rotatable pedestal 30, the optical axis of the lens 41 always passes the vertical axis, that is, the rotational center axis in the panning direction.

Meanwhile, the lens barrel 40 rotates in a tilting direction around the rotational center provided by a horizontal axis illustrated in FIG. 1 with respect to the rotatable pedestal 30. Therefore, the lens 41 can be directed upwardly or downwardly in accordance with the height of a participant in a conference or the height of a screen or the like for presentation. The horizontal axis which is the rotational center axis of the lens barrel 40 intersects with the optical axis of the lens 41 and intersects with the vertical axis which is the rotational center axis of the rotatable pedestal 30. Therefore, when the rotatable pedestal 30 or the lens barrel 40 is rotated suitably, the direction of the lens 41 can be controlled three-dimensionally and directed freely to various upward, downward, leftward and rightward directions while the intersecting point of the optical axis, vertical axis which is the rotational center axis in the panning direction and horizontal axis which is the rotational center axis in the tilting direction is kept at a fixed position.

In this manner, the video camera 10 of the present embodiment allows the lens barrel 40 to be rotated in the panning direction and the tilting direction. Then, since the lens barrel 40 is driven to rotate by a small minimum driving angle by sufficient driving force, it can capture an image pickup subject such as a participant in a conference with a high resolution at the center of a picked up image.

Now, rotational driving mechanisms for the lens barrel 40 of the video camera 10 of the present embodiment are described.

Figure 2:
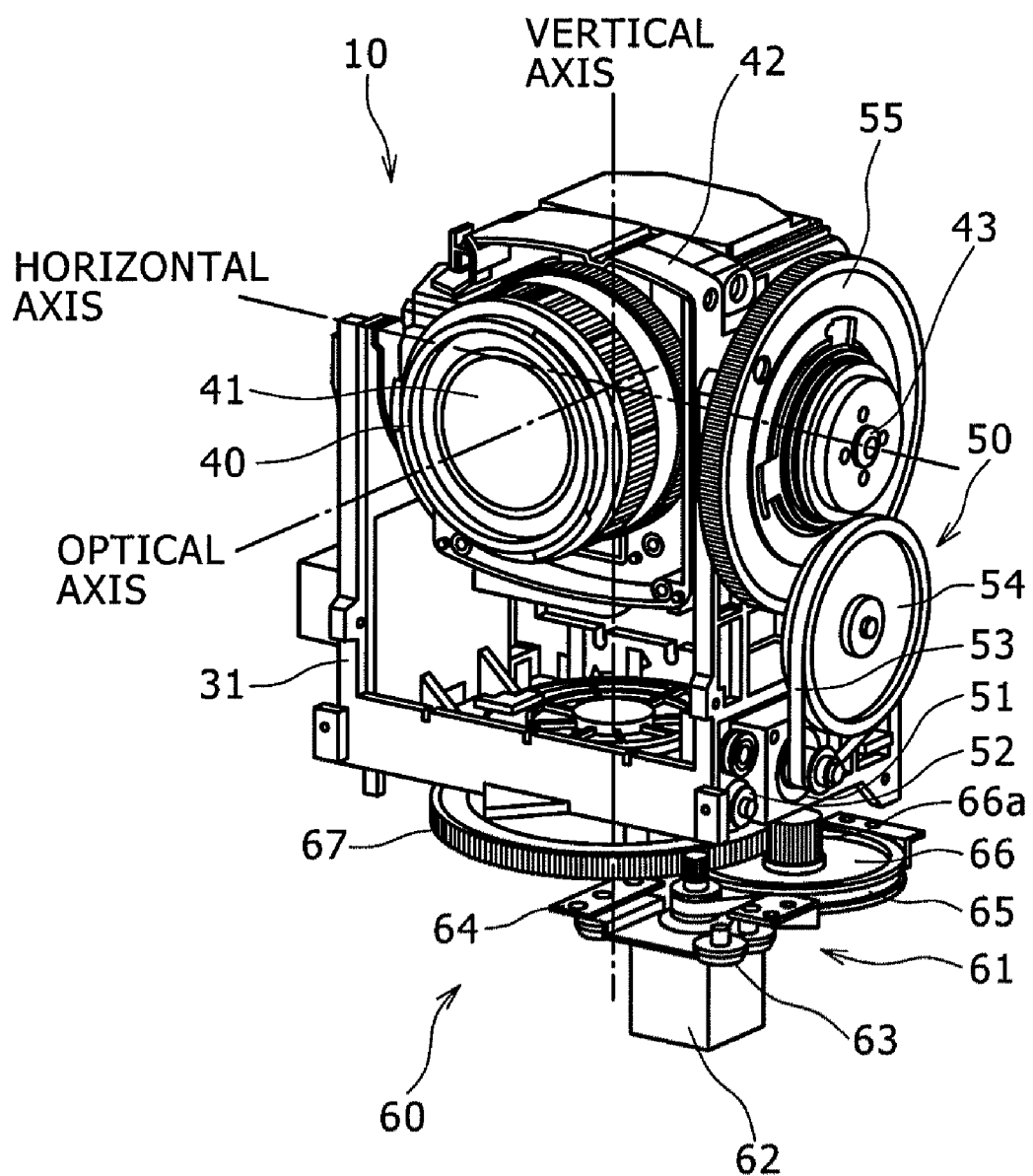
FIG. 2 is a perspective view showing an internal structure of the video camera.

FIG. 2 is a perspective view showing an internal structure of the video camera 10 of the present embodiment.

Referring to FIG. 2, the lens barrel 40 is supported on a lens chassis 42 such that the optical axis of the lens 41 intersects perpendicularly with the horizontal axis, that is, with the rotational center axis in the tilting direction. The lens chassis 42 includes a rotary shaft 43 for rotation in the tilting direction. The rotary shaft 43 is supported for rotation on a tilt chassis 31 disposed in the inside of the rotatable pedestal 30 (refer to FIG. 1) in an aligned relationship with the horizontal axis which is the rotational center axis in the tilting direction. Therefore, the lens barrel 40 supported on the tilt chassis 31 through the rotary shaft 43 of the lens chassis 42 and the lens 41 on the lens barrel 40 rotate in the tilting direction together with the lens chassis 42 with respect to the tilt chassis 31.

Further, the tilt chassis 31 is supported on the base pedestal 20 (refer to FIG. 1) for rotation around the vertical axis which is the rotational center axis in the panning direction. Therefore, the lens barrel 40 supported on the tilt chassis 31 through the rotary shaft 43 of the lens chassis 42 and the lens 41 on the lens barrel 40 rotate in the panning direction with respect to the base pedestal 20 together with the lens chassis 42 and the tilt chassis 31 while the optical axis of the lens 41 intersects with the vertical axis which is the rotational center axis in the panning direction.

In this manner, the lens barrel 40 and the lens 41 are rotatable in the tilting direction around the horizontal axis together with the lens chassis 42 with respect to the rotatable pedestal 30 and the tilt chassis 31 shown in FIG. 1. Further, the lens barrel 40 and the lens 41 are rotatable in the panning direction around the vertical axis together with the lens chassis 42 and the tilt chassis 31 with respect to the base pedestal 20 shown in FIG. 1. Though not shown, an image pickup device such as, for example, a CCD (Charge Coupled Device) device or a CMOS (Complementary Metal Oxide Semiconductor) device is attached to a rear end portion of the lens barrel 40. Therefore, if the lens barrel 40 and the lens 41 are rotated in the tilting direction or the panning direction, then light incoming from the direction forms an image on an image pickup plane of the image pickup device. Consequently, a bright-dark state of the image by light is photoelectrically converted into an amount of charge, and such amounts of charge are successively read out and converted into electric signals. An image of the image pickup subject in the direction is picked up thereby.

Here, rotation of the lens barrel 40 in the tilting direction and the panning direction, that is, rotation of the lens chassis 42 and the tilt chassis 31 in the directions, is carried out by rotational driving mechanisms therefor, that is, by a tilting rotational driving mechanism 50 and a panning rotational driving mechanism 60. In particular, the video camera 10 of the present embodiment includes, as the rotational driving mechanism in the tilting direction, the tilting rotational driving mechanism 50 which in turn includes a tilt motor 51, a vibration damper 52, a timing belt 53, a pulley 54 with a gear wheel, and a final plane gear wheel 55. All of the components of the tilting rotational driving mechanism 50 are disposed on the left side face of the tilt chassis 31, and the tilt motor 51 is attached through the vibration damper 52. The timing belt 53 extends between and around the tilt motor 51 and the pulley 54 with a gear wheel. The gear wheel of the pulley 54 with a gear wheel and the final plane gear wheel 55 are held in meshing engagement with each other, and the final plane gear wheel 55 is connected to the rotary shaft 43 of the lens chassis 42.

Accordingly, if the tilt motor 51 of the tilting rotational driving mechanism 50 is driven to rotate, then the driving force of the tilt motor 51 is transmitted to the pulley 54 with a gear wheel through the timing belt 53. Thereupon, the speed of rotation of the tilt motor 51 is reduced (first stage speed reduction), and generation of vibration, noise and so forth is prevented by the vibration damper 52 and the timing belt 53. Further, since the speed of rotation is reduced (second stage speed reduction) when the driving speed is transmitted from the pulley 54 with a gear wheel to the final plane gear wheel 55, the lens chassis 42 and the lens barrel 40 and lens 41 can be rotated by a minimum driving angle in the tilting direction around the rotary shaft 43, that is, around the horizontal axis. Besides, since the driving force of the tilt motor 51 is transmitted efficiently by two-stage speed reduction by the pulley 54 with a gear wheel and the final plane gear wheel 55, the lens barrel 40 which is large and heavy and has such a high performance that it can pick up an image of HD picture quality can be driven to rotate.

Further, the video camera 10 of the present embodiment includes a panning rotational driving mechanism 60 as a rotational driving mechanism in the panning direction. The panning rotational driving mechanism 60 includes a pan motor 62 serving as a driving source in an embodiment of the present invention, a vibration damper 63, a mounting plate 64, a timing belt 65, a pulley 66 with a gear wheel and a final plain gear wheel 67.

All of the components of the panning rotational driving mechanism 60 are disposed at a lower portion of the tilt chassis 31, and the pan motor 62 is attached to the mounting plate 64 through the vibration damper 63. Also the pulley 66 with a gear wheel is attached to the mounting plate 64, and the timing belt 65 extends between and around the pan motor 62 and the pulley 66 with a gear wheel. The pan motor 62, vibration damper 63, mounting plate 64, timing belt 65 and pulley 66 with a gear wheel are integrated to form a panning rotational driving unit 61, which is secured in the inside of the base pedestal 20 (refer to FIG. 1) by the mounting plate 64. Meanwhile, the final plain gear wheel 67 is disposed between the base pedestal 20 and the tilt chassis 31, and the plain gear wheel 66a of the pulley 66 with a gear wheel and the final plain gear wheel 67 are held in meshing engagement with each other.

Accordingly, if the pan motor 62 of the panning rotational driving mechanism 60 is driven to rotate, then the driving force of the pan motor 62 is transmitted in parallel to the pulley 66 with a gear wheel by the timing belt 65. Thereupon, the speed of rotation of the pan motor 62 is reduced (first stage speed reduction), and generation of vibration, noise and so forth is prevented by the vibration damper 63 and the timing belt 65. Further, the driving force is transmitted in parallel from the pulley 66 with a gear wheel to the final plain gear wheel 67 while the speed of rotation is reduced (second stage speed reduction) to rotate the tilt chassis 31 in the panning direction. Therefore, the lens barrel 40 and the lens 41 are rotated in the panning direction together with the tilt chassis 31 through the lens chassis 42.

In this manner, in the video camera 10 of the present embodiment, the lens barrel 40 and the lens 41 are rotated in the tilting direction by the tilting rotational driving mechanism 50 and are rotated also in the panning direction by the panning rotational driving mechanism 60. Then, a rotation detection apparatus for the lens barrel 40 is provided so that the rotational state of the lens barrel 40 in the tilting direction and the panning direction, that is, presence or absence of rotation of the lens barrel 40 and a limit position of the range of rotation, can be detected.

Now, a panning rotation detection apparatus 70 for the lens barrel 40 which serves as a lens barrel rotation detection apparatus in an embodiment of the present invention is described. It is to be noted that a tilting rotation detection apparatus 80 which serves as another lens barrel rotation detection apparatus in an embodiment of the present invention is hereinafter described.

Figure 3:
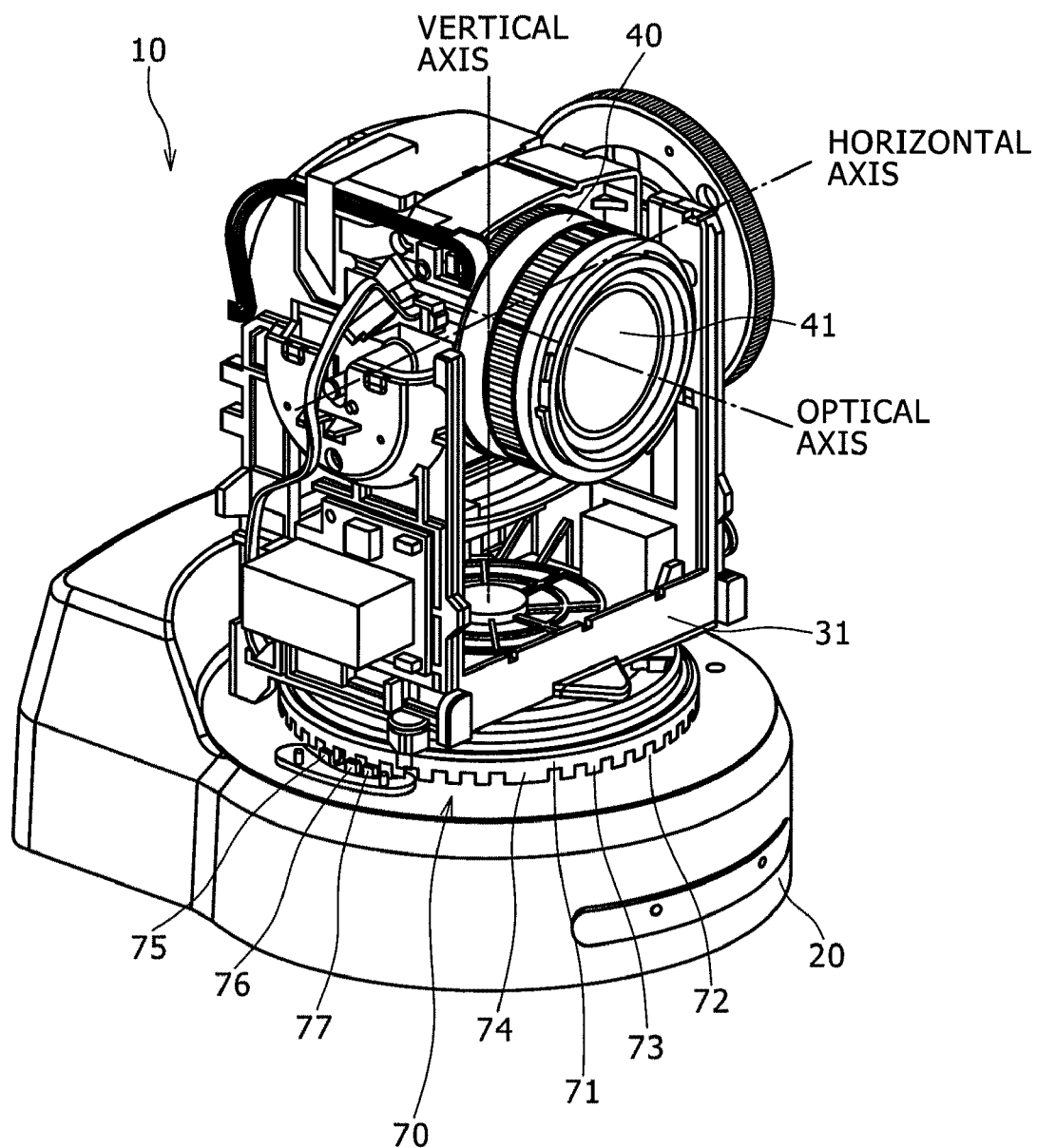
FIG. 3 is a perspective view showing a panning rotation detection apparatus of the video camera.

FIG. 3 is a perspective view showing the panning rotation detection apparatus 70 of the video camera 10 of the present embodiment.

Referring to FIG. 3, the panning rotation detection apparatus 70 includes a rotation detection ring 71 which serves as a rotational member in an embodiment of the present invention, and three photo-couplers 75 to 77 serving as rotation detection means in an embodiment of the present invention.

The rotation detection ring 71 is disposed on the outer side of the final plain gear wheel 67 (refer to FIG. 2) and rotates together with the tilt chassis 31. Therefore, when the pan motor 62 (refer to FIG. 2) is driven to rotate thereby to rotate the lens barrel 40 in the panning direction through the tilt chassis 31, then the rotation detection ring 71 rotates together with the rotation of the lens barrel 40. Then, since the rotation detection ring 71 has a comb-like shape such that light transmitting portions 72 and light intercepting portions 73 are disposed alternately at a fixed distance thereon, when the rotation detection ring 71 rotates, light beams emitted from light emitting members of the photo-couplers 75 to 77 are transmitted through the light transmitting portions 72 but are intercepted by the light intercepting portions 73.

The rotation detection ring 71 has a shutter 74 provided thereon for intercepting light from the light emitting members of the photo-couplers 75 to 77 and serving as a rotation limiting portion in an embodiment of the present invention. The shutter 74 is formed by closing up some of the light transmitting portions 72 at a position which makes a limit to a range of rotation of the lens barrel 40. It is to be noted that, while the shutter 74 is shown at a position at which it can be shown in FIG. 3, actually the shutter 74 is not provided at this position.

On the other hand, the three photo-couplers 75 to 77 are disposed in a row on the base pedestal 20 such that presence or absence of rotation of the rotation detection ring 71 and a limit position of the rotation can be detected in order to detect the rotational state of the rotation detection ring 71. Then, when the light receiving member of the first photo-coupler 75 is in a light receiving state and the light receiving members of the second photo-coupler 76 and the third photo-coupler 77 are in a no-light receiving state, the limit position of the range of rotation of the rotation detection ring 71 by rotation in one direction is detected. When the light receiving member of the first photo-coupler 75 is in a no-light receiving state and the light receiving members of the second photo-coupler 76 and the third photo-coupler 77 are in a light receiving state, the limit position of the range of rotation of the rotation detection ring 71 by rotation in the opposite direction is detected. It is to be noted that, in order to make preparations for rotation of the rotation detection ring 71 exceeding the limit positions, stoppers not shown for the tilt chassis 31 are provided on the base pedestal 20.

Figure 4:
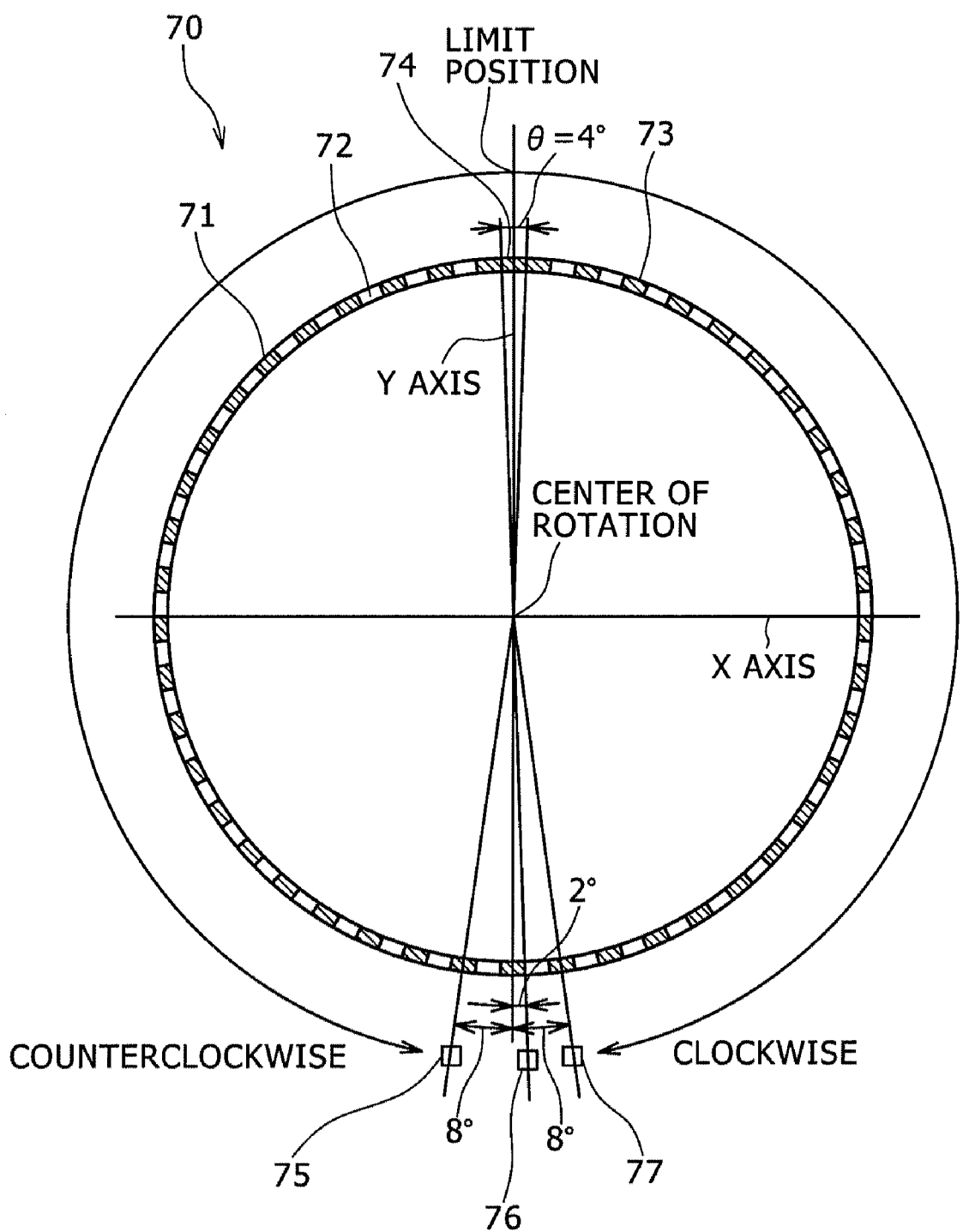
FIG. 4 is a plan view showing the panning rotation detection apparatus of the video camera.

FIG. 4 is a plan view showing the panning rotation detection apparatus 70 of the video camera 10 of the present embodiment.

It is to be noted that the X axis and the Y axis shown in FIG. 4 are indicated for the convenience of description, and the X axis coincides with the optical axis while the positive direction of the X axis coincides with the front direction of the lens 41 (refer to FIG. 3). Further, FIG. 4 illustrates an example of the distance θ between adjacent ones of the light transmitting portions 72 and the light intercepting portions 73 from which a limit position of the range of rotation or the like of the rotation detection ring 71 can be detected, the position of the shutter 74 and the arrangement of the photo-couplers 75 to 77. However, the present invention is not limited to this.

Referring to FIG. 4, the light transmitting portions 72 and the light intercepting portions 73 are disposed alternately over the overall circumference of the rotation detection ring 71 of the panning rotation detection apparatus 70. One of the light transmitting portions 72 is filled up to form the shutter 74. Further, the three photo-couplers 75 to 77 are arranged for the single rotation detection ring 71.

The distance θ between adjacent ones of the light transmitting portions 72 and the light intercepting portions 73 is determined from a resolution necessary to detect rotation of the rotation detection ring 71 in the panning direction and the limit positions of the range of rotation. In particular, in the video camera 10 of the present embodiment, the first photo-coupler 75 and the third photo-coupler 77 are displaced individually by 8° from the Y axis on the negative direction side while the distances from the position on the Y axis on the positive direction side to the limit positions of the range of rotation in the clockwise direction and the counterclockwise direction are individually set to 172° (=180°−8°), the distance θ between adjacent ones of the light transmitting portions 72 and the light intercepting portion 73 is 4° (=(180°−172°)/2) from the center of rotation. Then, from among the light transmitting portions 72 and the light intercepting portions 73 juxtaposed regularly in a pattern of the fixed distance of 4°, the center of one light transmitting portion 72 is positioned on the Y axis on the positive direction side and only this light transmitting portion 72 is closed up to form the shutter 74 which indicates the limit positions of rotation.

Further, based on the fact that the distance θ between adjacent ones of the light transmitting portions 72 and the light intercepting portions 73 is set to 4° (θ=4°), the photo-couplers 75 to 77 are positioned such that the first photo-coupler 75 is displaced by 8° (=2θ) in the clockwise direction from the Y axis on the negative direction side; the second photo-coupler 76 is displaced by 2° (=θ/2) in the counterclockwise direction; and the third photo-coupler 77 is displaced by 8° (=2θ) in the counterclockwise direction. Thus, the distance between the first photo-coupler 75 and the second photo-coupler 76 is set to 10° (=2θ+(θ/2)), and the distance between the second photo-coupler 76 and the third photo-coupler 77 is set to 6° (=2θ−(θ/2)).

In the panning rotation detection apparatus 70 having such a configuration as described above, if the rotation detection ring 71 rotates in the clockwise direction or the counterclockwise direction, then the rotational state of the rotation detection ring 71 can be detected from the distance θ between the light transmitting portion 72 and the light intercepting portion 73 of the rotation detection ring 71, the position of the shutter 74 and the arrangement of the photo-couplers 75 to 77 described above. In particular, if the photo-couplers 75 to 77 repeat a light receiving state and a no-light receiving state, then it is detected whether or not the rotation detection ring 71 is rotated, and if the shutter 74 comes to the position of any of the photo-couplers 75 to 77, then a limit position of the range of rotation of the rotation detection ring 71 is detected.

Figure 5:
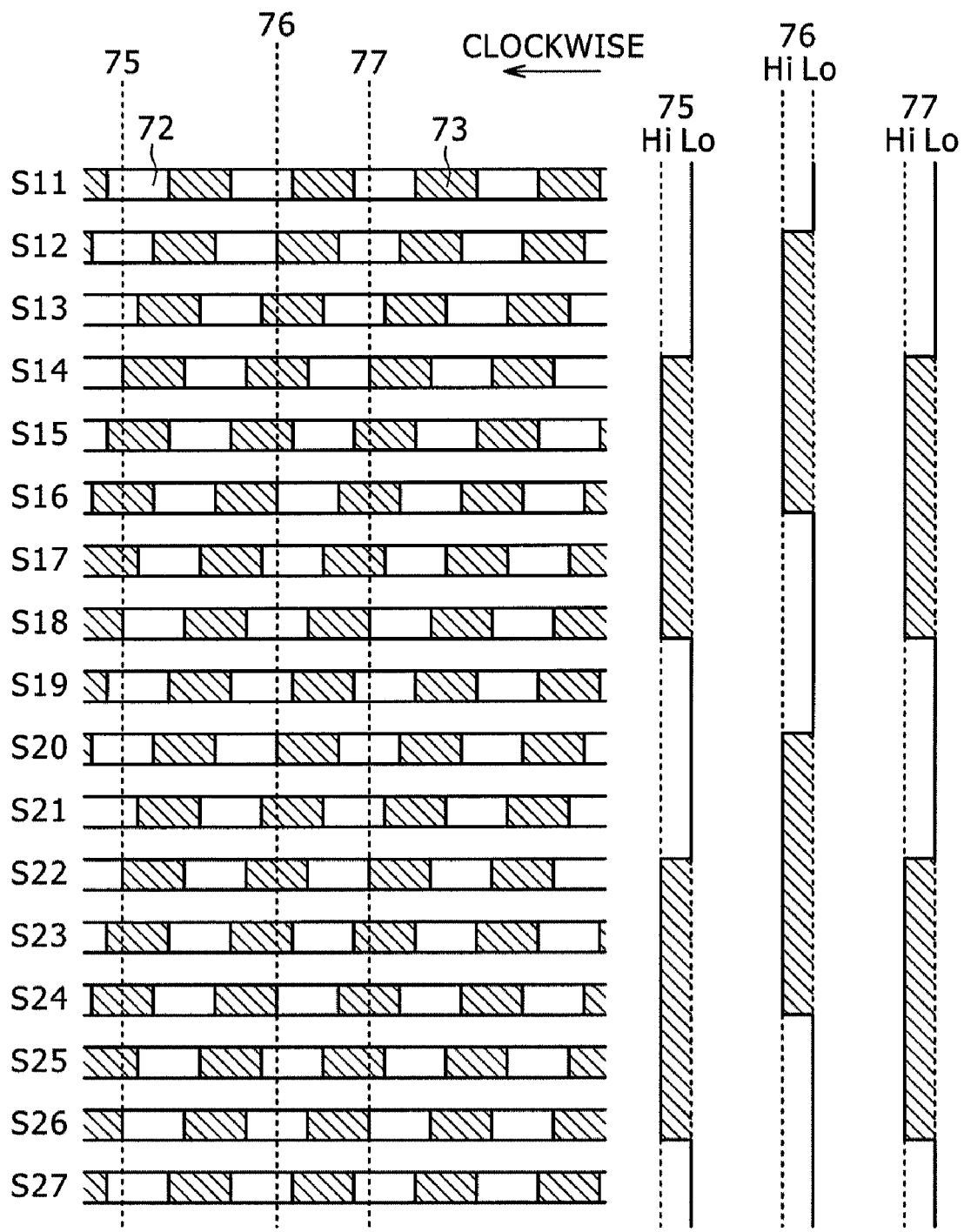
FIG. 5 is a diagrammatic view illustrating light receiving states and no-light receiving states of photo-couplers of the panning rotation detection apparatus when a rotation detection ring of the panning rotation detection apparatus rotates in the clockwise direction and illustrating detection of presence or absence of rotation of the rotation detection ring.

FIG. 5 illustrates light receiving states and no-light receiving states of the photo-couplers 75 to 77 when the rotation detection ring 71 of the panning rotation detection apparatus 70 rotates in the clockwise direction for detecting whether or not the rotation detection ring 71 is rotated.

It is to be noted that it is assumed in the following description that a state wherein a light beam emitted from any of the light emitting members of the photo-couplers 75 to 77 is transmitted through a light transmitting portion 72 and places the light receiving member into a light receiving state is represented by "Lo (Low)" and another state wherein a light beam emitted from any of the light emitting members is intercepted by a light intercepting portion 73 and places the light receiving member into a no-light emitting state is represented by "Hi (High)" for the convenience of illustration and description.

Referring to FIG. 5, a step S11 indicates a state wherein the first photo-coupler 75 is positioned at a light transmitting portion 72 and the second photo-coupler 76 is positioned at another light transmitting portion 72 while the third photo-coupler 77 is positioned at a further light transmitting portion 72. Therefore, where the outputs of the photo-couplers 75 to 77 are checked by software, then they are "Lo-Lo-Lo".

Then, if the light transmitting portions 72 and the light intercepting portions 73 are displaced leftwardly in FIG. 5 by clockwise rotation of the rotation detection ring 71 (refer to FIG. 4), then a positional relationship illustrated at step S12 is established. At step S12, the second photo-coupler 76 is placed into alignment with a light intercepting portion 73, and consequently, the outputs of the photo-couplers 75 to 77 change to "Lo-Hi-Lo". Then, also at next step S13, a positional relationship same as that at step S12 is maintained, and therefore, the outputs of the photo-couplers 75 to 77 are "Lo-Hi-Lo".

Thereafter, when a positional relationship illustrated at step S14 is established, also the first photo-coupler 75 and the third photo-coupler 77 are disturbed by light intercepting portions 73. Consequently, the outputs of the photo-couplers 75 to 77 change to "Hi-Hi-Hi". Since the same positional relationship is maintained also at subsequent steps S15 and S16, the outputs of the photo-couplers 75 to 77 remain "Hi-Hi-Hi".

Thereafter, when a positional relationship at step S17 is reached, then the second photo-coupler 76 is placed into alignment with a light transmitting portion 72, and consequently, the outputs of the photo-couplers 75 to 77 change to "Hi-Lo-Hi". Since the same positional relationship is maintained also at subsequent step S18, the outputs of the photo-couplers 75 to 77 remain "Hi-Lo-Hi". Then at next step S19, the positional relationship at step S11 is restored, and consequently, the outputs of the photo-couplers 75 to 77 return to "Lo-Lo-Lo". It is to be noted that, at subsequent steps S20 to S27, the same positional relationships as those at steps S12 to S19 are established, respectively.

In this manner, when the rotation detection ring 71 (refer to FIG. 4) rotates in the clockwise direction, the outputs of the photo-couplers 75 to 77 change from "Lo-Lo-Lo" at step S11 successively to "Lo-Hi-Lo", "Hi-Hi-Hi" and "Hi-Lo-Hi". Then at step S19, the outputs of the photo-couplers 75 to 77 return to "Lo-Lo-Lo" same as those at step S11. Thereafter, the outputs of the photo-couplers 75 to 77 repeat the same change patterns. Therefore, as far as the patterns at steps S11 to S18 are repeated, presence of rotation of the rotation detection ring 71 continues to be detected. On the other hand, if the outputs of the photo-couplers 75 to 77 stop at one of the patterns at steps S11 to S18 and exhibit no change to a different pattern, absence of rotation of the rotation detection ring 71 is detected.

Figure 6:
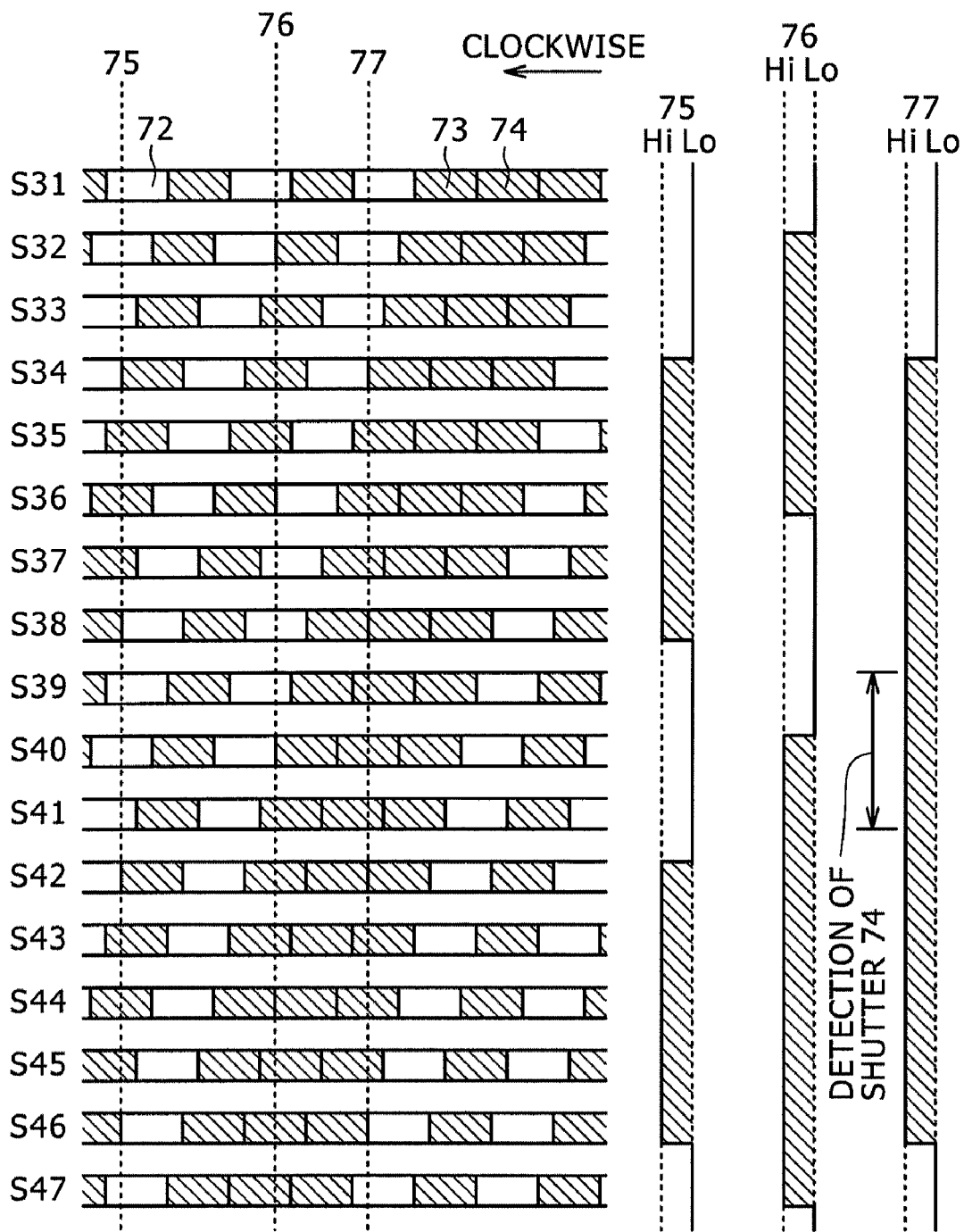
FIG. 6 is a similar view but illustrating detection of a limit position of a range of clockwise rotation of the rotation detection ring.

FIG. 6 illustrates light receiving states and no-light receiving states of the photo-couplers 75 to 77 when the rotation detection ring 71 of the panning rotation detection apparatus 70 rotates in the clockwise direction and a limit position of the range of rotation in the clockwise direction is detected.

Steps S31 to S47 illustrated in FIG. 6 indicate a state wherein the shutter 74 passes in front of the photo-couplers 75 to 77, and the limit position of the range of rotation in the clockwise direction is detected from patterns of "Lo" and "Hi" of the outputs of the photo-couplers 75 to 77.

The step S31 illustrated in FIG. 6 indicates a state wherein the shutter 74 does not reach the third photo-coupler 77 as yet and the first photo-coupler 75, second photo-coupler 76 and third photo-coupler 77 are individually positioned in alignment with different light transmitting portions 72. Consequently, the outputs of the photo-couplers 75 to 77 are "Lo-Lo-Lo".

Then, if the light transmitting portions 72 and the light intercepting portions 73 are displaced leftwardly in FIG. 6 by clockwise rotation of the rotation detection ring 71 (refer to FIG. 4), then a positional relationship illustrated at step S32 is established and the second photo-coupler 76 is placed into alignment with a light intercepting portion 73. Consequently, the outputs of the photo-couplers 75 to 77 change to "Lo-Hi-Lo". Then, since the positional relationship at step S32 is maintained also at next step S33, the outputs of the photo-couplers 75 to 77 remain "Lo-Hi-Lo".

Thereafter, when a positional relationship illustrated at step S34 is established, also the first photo-coupler 75 and the third photo-coupler 77 are individually placed into alignment with light intercepting portions 73. Consequently, the outputs of the photo-couplers 75 to 77 change to "Hi-Hi-Hi". Since the same positional relationship is maintained also at subsequent steps S35 and S36, the outputs of the photo-couplers 75 to 77 remain "Hi-Hi-Hi".

Thereafter, when a positional relationship at step S37 is reached, the second photo-coupler 76 is placed into alignment with a light transmitting portion 72, and consequently, the outputs of the photo-couplers 75 to 77 change to "Hi-Lo-Hi". Since the same positional relationship is maintained also at subsequent step S38, the outputs of the photo-couplers 75 to 77 remain "Hi-Lo-Hi". Thus, since the shutter 74 is not associated with any one of the photo-couplers 75 to 77 at steps S31 to S38, the outputs of the photo-couplers 75 to 77 at steps S31 to S38 have the same patterns as those at steps S11 to S18 described hereinabove with reference to FIG. 5, respectively.

However, at next step S39, the shutter 74 is placed into alignment with the third photo-coupler 77 and intercepts the light of the third photo-coupler 77, the outputs of the photo-couplers 75 to 77 change to "Lo-Lo-Hi". Then at step S40, the second photo-coupler 76 is placed into alignment with a light intercepting portion 73, and consequently, the outputs of the photo-couplers 75 to 77 change to "Lo-Hi-Hi". It is to be noted that, till next step S41, since the shutter 74 remains in alignment with the third photo-coupler 77 and intercepts the light of the third photo-coupler 77, the outputs of the photo-couplers 75 to 77 remain "Lo-Hi-Hi". Further, at steps S42 to S44, the shutter 74 is positioned between the third photo-coupler 77 and the second photo-coupler 76, and consequently, the outputs of the photo-couplers 75 to 77 exhibit patterns same as those at steps S22 to S24 illustrated in FIG. 5.

In this manner, when the positional relationship at step S39 is established, the outputs of the photo-couplers 75 to 77 exhibit "Lo-Lo-Hi" only in this situation, and this pattern appears for the first time when the shutter 74 is placed into alignment with the third photo-coupler 77 and intercepts the light of the third photo-coupler 77. In other words, the pattern described does not appear at any of steps S11 to S19 and steps S19 to S27 of FIG. 5 at which the shutter 74 is not associated with the photo-couplers 75 to 77. Therefore, the limit position of the range of rotation in the clockwise direction is detected from "Lo-Lo-Hi" of the outputs of the photo-couplers 75 to 77.

Further, taking it into consideration that the third photo-coupler 77 may exhibit "Hi" in error by external noise or the like, the outputs of the photo-couplers 75 to 77 are confirmed also at next step S40. Then, if it is confirmed that the outputs of the photo-couplers 75 to 77 are "Lo-Hi-Hi" at step S40, then since this state appears for the first time when the shutter 74 is placed into alignment with the third photo-coupler 77 and intercepts the light of the third photo-coupler 77, it can be decided that the tilt chassis 31 is at the limit position of the range of rotation in the clockwise direction. Therefore, the limit position is detected with certainty.

Figure 7:
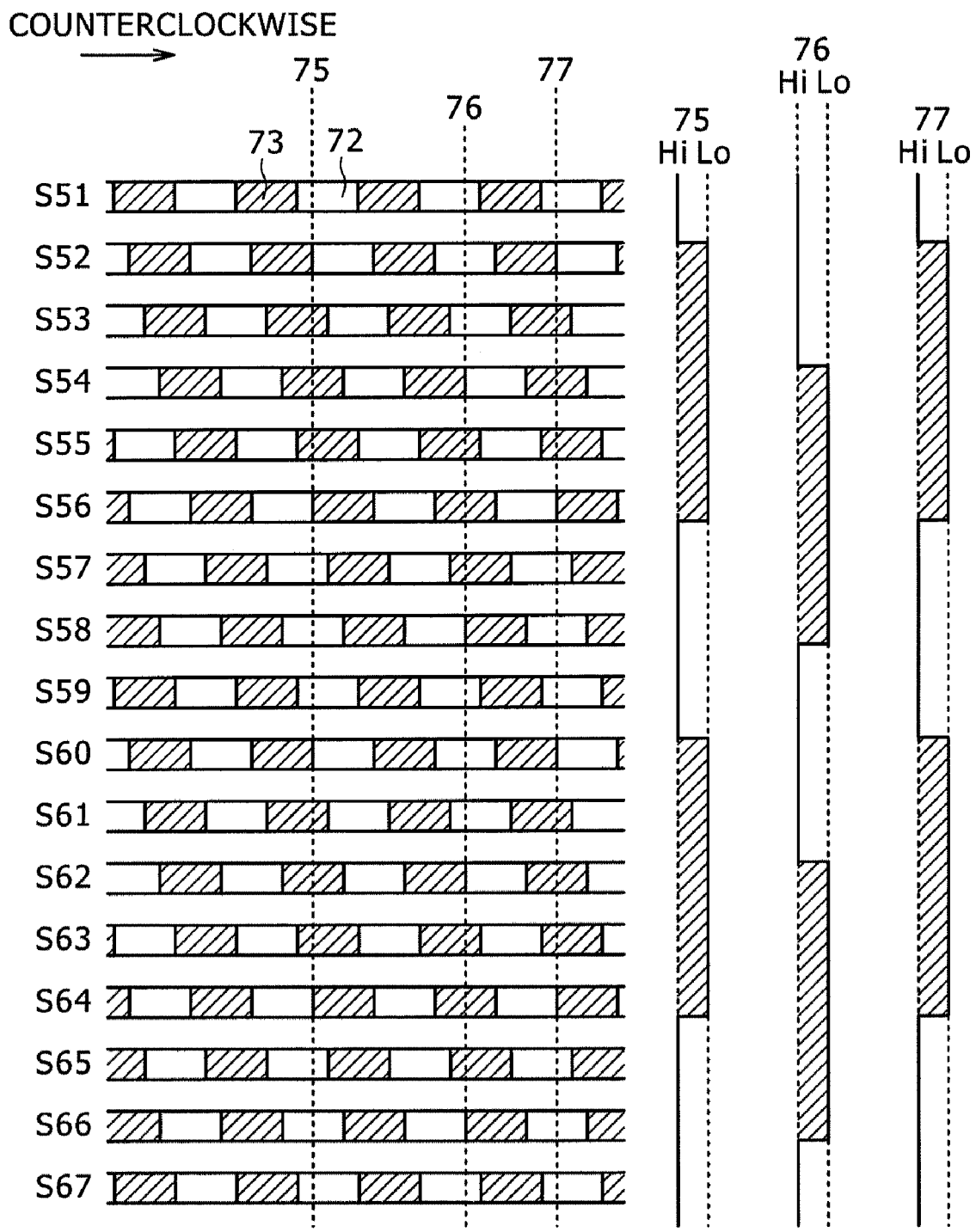
FIG. 7 is a diagrammatic view illustrating light receiving states and no-light receiving states of the photo-couplers of the panning rotation detection apparatus when the rotation detection ring rotates in the counterclockwise direction and illustrating detection of presence or absence of rotation of the rotation detection ring.

FIG. 7 illustrates light receiving states and no-light receiving states of the photo-couplers 75 to 77 when the rotation detection ring 71 of the panning rotation detection apparatus 70 rotates in the counterclockwise direction.

Referring to FIG. 7, step S51 indicates a state wherein the first photo-coupler 75 is positioned at a light transmitting portion 72 and the second photo-coupler 76 is positioned at another light transmitting portion 72 while the third photo-coupler 77 is positioned at a further light transmitting portion 72. Therefore, the outputs of the photo-couplers 75 to 77 are "Lo-Lo-Lo".

Then, if the light transmitting portions 72 and the light intercepting portions 73 are displaced rightwardly in FIG. 7 by counterclockwise rotation of the rotation detection ring 71 (refer to FIG. 4), then a positional relationship illustrated at step S52 is established. At step S52, the first photo-coupler 75 and the third photo-coupler 77 are individually placed into alignment with light intercepting portions 73, and therefore, the outputs of the photo-couplers 75 to 77 change to "Hi-Lo-Hi". Then, also at next step S53, a positional relationship same as that at step S52 is maintained, and therefore, the outputs of the photo-couplers 75 to 77 remain "Hi-Lo-Hi".

Thereafter, when a positional relationship illustrated at step S54 is established, also the second photo-coupler 76 is placed into alignment with a light intercepting portion 73. Consequently, the outputs of the photo-couplers 75 to 77 change to "Hi-Hi-Hi". Since the same positional relationship is maintained also at subsequent steps S55 and S56, the outputs of the photo-couplers 75 to 77 remain "Hi-Hi-Hi".

Thereafter, when a positional relationship at step S57 is reached, the first photo-coupler 75 and the third photo-coupler 77 are individually placed into alignment with light transmitting portions 72, and consequently, the outputs of the photo-couplers 75 to 77 change to "Lo-Hi-Lo". Since the same positional relationship is maintained also at subsequent step S58, the outputs of the photo-couplers 75 to 77 remain "Lo-Hi-Lo". Then at next step S59, the positional relationship at step S51 is restored, and consequently, the outputs of the photo-couplers 75 to 77 return to "Lo-Lo-Lo". It is to be noted that, at subsequent steps S60 to S67, the same positional relationships as those at steps S52 to S59 are established, respectively.

In this manner, when the rotation detection ring 71 (refer to FIG. 4) rotates in the counterclockwise direction, the outputs of the photo-couplers 75 to 77 change from "Lo-Lo-Lo" at step S51 successively to "Hi-Lo-Hi", "Hi-Hi-Hi" and "Lo-Hi-Lo". Then at step S59, the outputs of the photo-couplers 75 to 77 return to "Lo-Lo-Lo" same as those at step S51. Thereafter, the outputs of the photo-couplers 75 to 77 repeat the same change patterns. Therefore, as far as the patterns at steps S51 to S58 are repeated, presence of rotation of the rotation detection ring 71 continues to be detected. On the other hand, if the outputs of the photo-couplers 75 to 77 stop at one of the patterns at steps S51 to S58 and exhibit no change to a different pattern, absence of rotation of the rotation detection ring 71 is detected.

Figure 8:
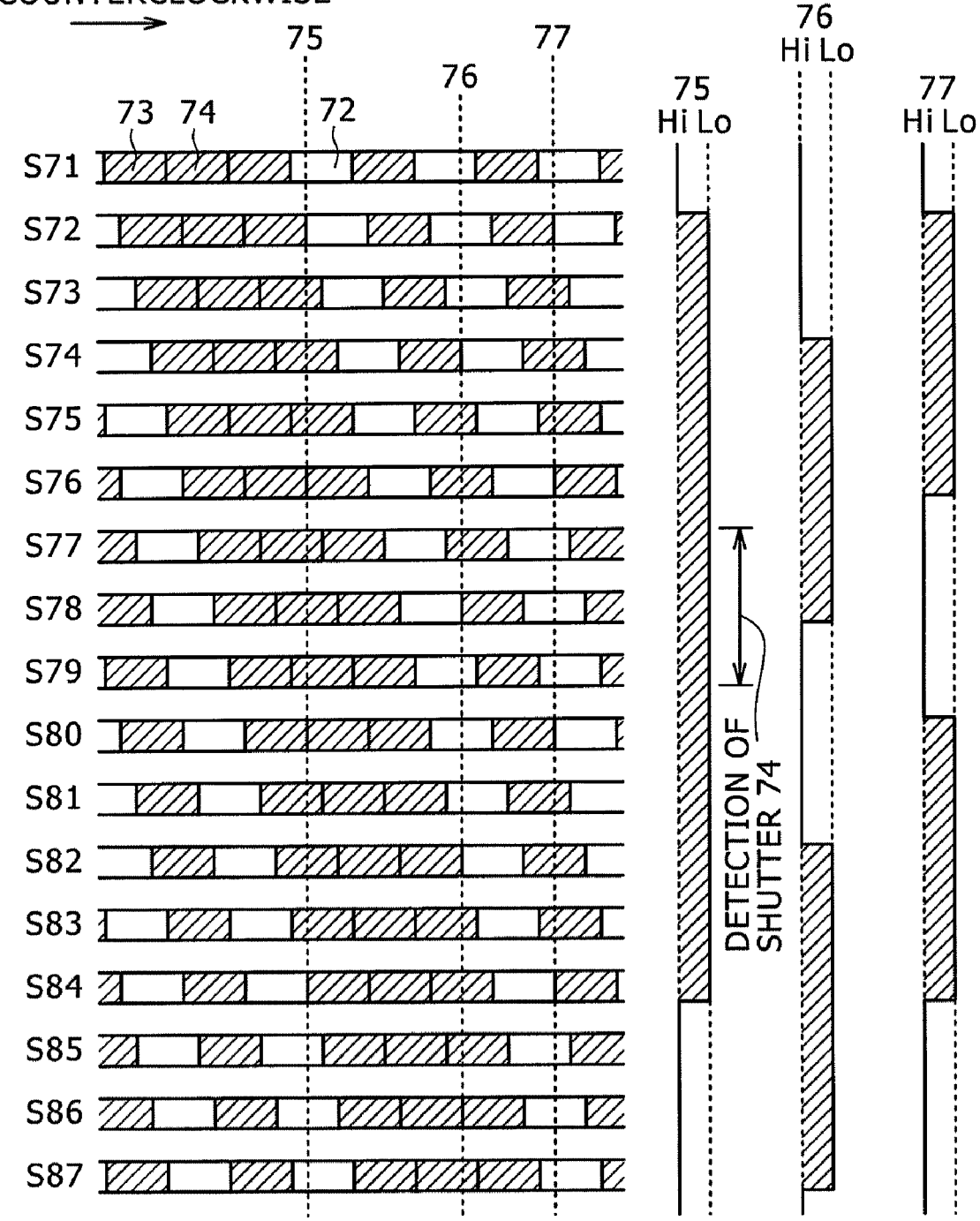
FIG. 8 is a similar view but illustrating detection of a limit position of a range of counterclockwise rotation of the rotation detection ring.

FIG. 8 illustrates light receiving states and no-light receiving states of the photo-couplers 75 to 77 when the rotation detection ring 71 of the panning rotation detection apparatus 70 rotates in the counterclockwise direction and a limit position of the range of rotation in the counterclockwise direction is detected.

Steps S71 to S87 illustrated in FIG. 8 indicate a state wherein the shutter 74 passes in front of the photo-couplers 75 to 77, and a limit position of the range of rotation in the counterclockwise direction is detected from patterns of "Lo" and "Hi" of the outputs of the photo-couplers 75 to 77.

The step S71 illustrated in FIG. 8 indicates a state wherein the shutter 74 does not reach the first photo-coupler 75 as yet and the first photo-coupler 75, second photo-coupler 76 and third photo-coupler 77 are individually positioned in alignment with different light transmitting portions 72. Consequently, the outputs of the photo-couplers 75 to 77 are "Lo-Lo-Lo".

Then, if the light transmitting portions 72 and the light intercepting portions 73 are displaced rightwardly in FIG. 8 by counterclockwise rotation of the rotation detection ring 71 (refer to FIG. 4), then a positional relationship illustrated at step S72 is established and the first photo-coupler 75 and the third photo-coupler 77 are individually placed into alignment with a light intercepting portion 73. Consequently, the outputs of the photo-couplers 75 to 77 change to "Hi-Lo-Hi". Then, since the positional relationship at step S72 is maintained also at next step S73, the outputs of the photo-couplers 75 to 77 remain "Lo-Hi-Lo".

Thereafter, when a positional relationship illustrated at step S74 is established, also the second photo-coupler 76 is placed into alignment with a light intercepting portion 73. Consequently, the outputs of the photo-couplers 75 to 77 change to "Hi-Hi-Hi". Since the same positional relationship is maintained also at subsequent steps S75 and S76, the outputs of the photo-couplers 75 to 77 remain "Hi-Hi-Hi".

However, if a positional relationship at step S77 is reached, then the shutter 74 is placed into alignment with the first photo-coupler 75 next to the light intercepting portion 73 and intercepts the light of the first photo-coupler 75, and only the third photo-coupler 77 remains in alignment with the light transmitting portion 72. Consequently, the outputs of the photo-couplers 75 to 77 change to "Hi-Hi-Lo". Since the shutter 74 remains in alignment with the first photo-coupler 75 and intercepts the light of the first photo-coupler 75 also at next step S78, the outputs of the photo-couplers 75 to 77 remain "Hi-Hi-Lo".

Further, also at next step S79, although the shutter 74 remains in alignment with the first photo-coupler 75 and intercepts the light of the first photo-coupler 75, since the second photo-coupler 76 is placed into alignment with a light transmitting portion 72, the outputs of the photo-couplers 75 to 77 change to "Hi-Lo-Lo". It is to be noted that, at next steps S80 to S86, the shutter 74 is positioned between the first photo-coupler 75 and the second photo-coupler 76, and consequently, the outputs of the photo-couplers 75 to 77 exhibit patterns same as those at steps S60 to S66 illustrated in FIG. 7.

In this manner, when the positional relationship at step S77 is established, the outputs of the photo-couplers 75 to 77 exhibit "Hi-Hi-Lo" only in this situation, and this pattern appears for the first time when the shutter 74 is placed into alignment with the first photo-coupler 75 and intercepts the light of the first photo-coupler 75. In other words, the pattern described does not appear at any of steps S51 to S59 and steps S59 to S67 of FIG. 7 at which the shutter 74 is not associated with the photo-couplers 75 to 77. Therefore, the limit position of the range of rotation in the counterclockwise direction is detected from "Hi-Hi-Lo" of the outputs of the photo-couplers 75 to 77.

Further, taking it into consideration that the first photo-coupler 75 may exhibit "Hi" in error by external noise or the like, the outputs of the photo-couplers 75 to 77 are confirmed also at next step S78. Then, if it is confirmed that the outputs of the photo-couplers 75 to 77 are "Hi-Hi-Lo" at step S78, then it can be decided that the tilt chassis 31 is at the limit position of the range of rotation in the counterclockwise direction. Therefore, the limit position is detected with certainty.

Accordingly, as far as the patterns at steps S11 to S18 illustrated in FIG. 5 or the patterns at steps S51 to S58 illustrated in FIG. 7 are repeated, presence of rotation of the rotation detection ring 71 (refer to FIG. 4) is detected. On the other hand, the limit position of the range of rotation in the clockwise direction is detected from "Lo-Lo-Hi" of the outputs of the photo-couplers 75 to 77 as at step S39 illustrated in FIG. 6. Further, the limit position of the range of rotation in the clockwise direction is detected from "Hi-Hi-Lo" of the outputs of the photo-couplers 75 to 77 as at step S77 illustrated in FIG. 8.

Incidentally, the video camera 10 rotates not only in the panning direction but also in the tilting direction. Therefore, also with regard to the tilting direction, it is necessary to detect a rotational state of the video camera 10, that is, presence or absence of rotation and a limit position of the range of rotation.

Therefore, the tilting rotation detection apparatus 80 of the video camera 10 of the present invention is described below.

Figure 9:
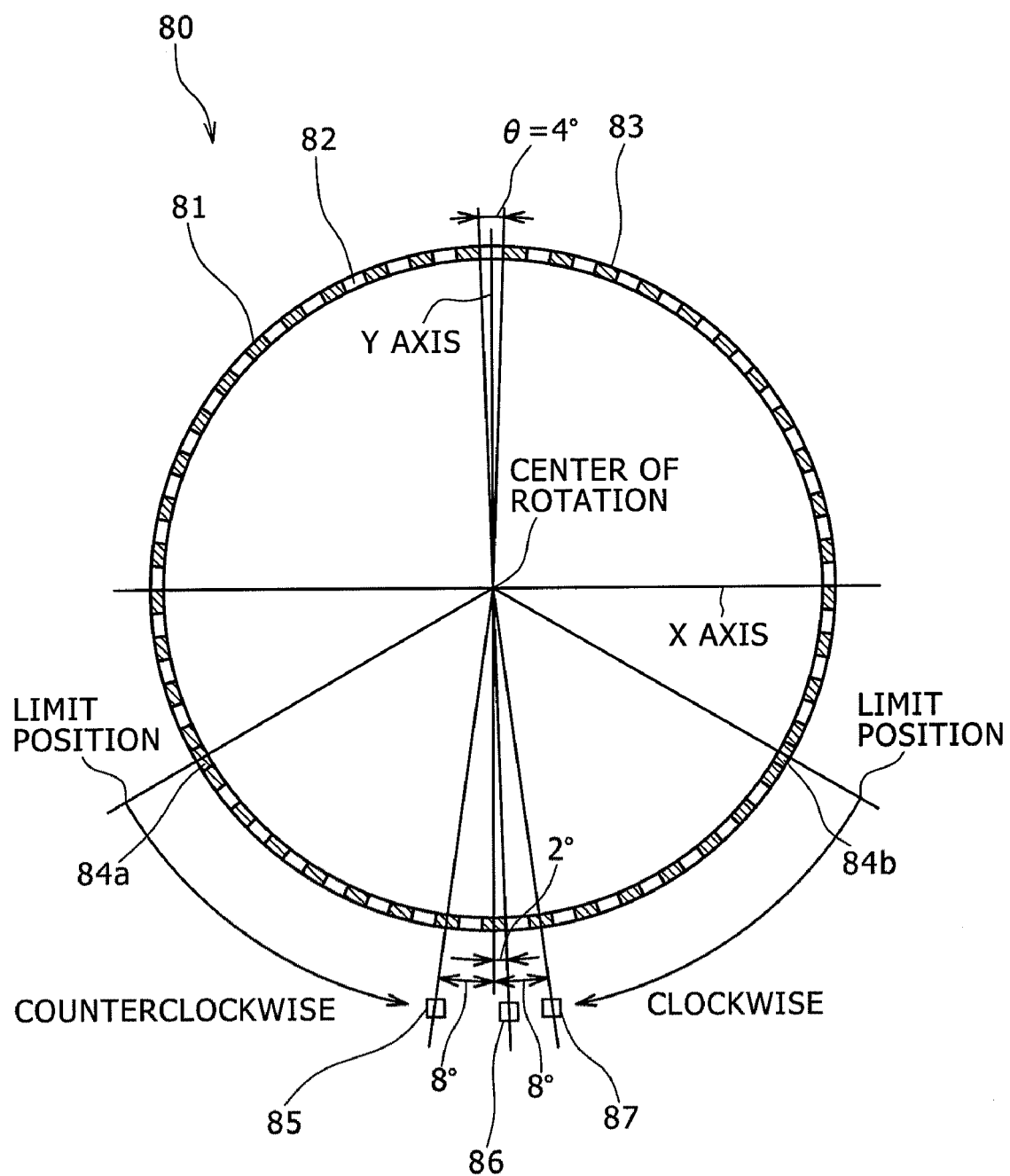
FIG. 9 is a plan view showing a tilting rotation detection apparatus of the video camera.

FIG. 9 shows the tilting rotation detection apparatus 80 of the video camera 10 according to the present embodiment.

Referring to FIG. 9, the tilting rotation detection apparatus 80 includes a single rotation detection ring 81 serving as a rotatable member in an embodiment of the present invention, and three photo-couplers 85 to 87 serving as rotation detection means in an embodiment of the present invention. Light transmitting portions 82 and light intercepting portions 83 are disposed alternately over the overall circumference of the rotation detection ring 81. Two of the light transmitting portions 82 are filled up to form a shutter 84a and another shutter 84b. Further, the three photo-couplers 85 to 87 are arranged for the single rotation detection ring 81.

The distance θ between adjacent ones of the light transmitting portions 82 and the light intercepting portions 83 is determined from a resolution necessary to detect rotation of the rotation detection ring 81 in the tilting direction and the limit positions of the range of rotation. In particular, in the rotation detection ring 81 shown in FIG. 9, the distance θ is set to 4° from the center of rotation similarly as in the rotation detection ring 71 shown in FIG. 4. Also the photo-couplers 85 to 87 are positioned similarly such that the first photo-coupler 85 is displaced by 8° (=2θ) in the clockwise direction from the Y axis on the negative direction side; the second photo-coupler 86 is displaced by 2° (=θ/2) in the counterclockwise direction; and the third photo-coupler 87 is displaced by 8° (=2θ) in the counterclockwise direction. Thus, the distance between the first photo-coupler 85 and the second photo-coupler 86 is set to 10° (=2θ+(θ/2)), and the distance between the second photo-coupler 86 and the third photo-coupler 87 is set to 6° (=2θ−(θ/2)).

On the other hand, the shutters 84a and 84b are positioned in a corresponding relationship to the limit positions of the range of movement in the tilting direction such that the shutter 84a is displaced by 60° in the clockwise direction from the Y axis on the negative direction side and the shutter 84b is displaced by 60° in the counterclockwise direction. Thus, the limit positions of the range of rotation of the tilting rotation detection apparatus 80 can be detected depending upon whether or not any one of the two shutters 84a and 84b corresponding to the limit positions reaches the position of the photo-couplers 85 to 87 in a similar manner as in the detection of the limit positions of the range of rotation of the panning rotation detection apparatus 70 (refer to FIGS. 6 and 8). It is to be noted that also presence or absence of rotation of the rotation detection ring 81 can be detected from repetition patterns of light receiving states and no-light receiving states of the photo-couplers 85 to 87.

Accordingly, the panning rotation detection apparatus 70 or the tilting rotation detection apparatus 80 can detect presence or absence of rotation and a limit position of the range of the rotation by means of the single rotation detection ring 71 or the rotation detection ring 81. Further, the panning rotation detection apparatus 70 and the tilting rotation detection apparatus 80 increase the degree of freedom in design of the layout and so forth of the video camera 10. Furthermore, since the shutter 74 or the shutters 84a and 84b can be formed by closing up some of the light transmitting portions 72 or the light transmitting portions 82, molding of the rotation detection ring 71 and the rotation detection ring 81 is easy, and also undesirable quality of the rotation detection ring 71 and the rotation detection ring 81 decreases.

While the preferred embodiment of the present invention is described above, the present invention is not limited to the embodiment described above but allows, for example, such various modifications or alterations as described below.

(1) While, in the present embodiment, the video camera 10 for a conference room is taken as an example of the lens barrel rotation type image pickup apparatus, the lens barrel rotation type image pickup apparatus is not limited to the video camera 10 but may be any image pickup apparatus only if the lens barrel 40 rotates. Further, while the video camera 10 of the present embodiment can rotate in both of the panning direction and the tilting direction, the panning rotation detection apparatus 70 can be applied only if the video camera 10 can rotate in the panning direction, but the tilting rotation detection apparatus 80 can be applied only if the video camera 10 can rotate in the tilting direction.

(2) While, in the present embodiment, the distance θ between adjacent ones of the light transmitting portions 72 and the light intercepting portion 73 and between adjacent ones of the light transmitting portions and the light intercepting portions 83 is set to 4° from the center of rotation, the distance θ is not limited to this, but may be determined depending upon a resolution necessary to detect rotation in the panning direction or the tilting direction and limit positions of the range of the rotation.

What is claimed is:

1. A lens barrel rotation detection apparatus for detecting a rotational state of a lens barrel to which a lens for image pickup is attached and which is rotated in a horizontal direction or a vertical direction by driving force of a driving section, comprising:

a single rotatable member rotatable together with rotation of said lens barrel; and three rotation detection means for detecting a rotational state of said rotatable member;

said rotatable member having a fixed pattern of indicia formed on said rotatable member so as to be detected by said rotation detection means and a rotation limit section indicative of limit positions of a range of rotation of said lens barrel; and said rotation detection means being disposed for detection of presence or absence of rotation of said rotatable member and the limit positions of the range of rotation, said three rotation detection means detecting a first arrangement of said indicia when said rotatable member rotates in a first direction to a first limit position and a second arrangement of said indicia when said rotatable member rotates in an opposite direction to a second limit position, wherein said first and second arrangement of said indicia differ from each other.

2. The lens barrel rotation detection apparatus according to claim 1, wherein each of said rotation detection means is a photo-coupler including a light emitting member and a light receiving member;

said rotatable member is a rotation detection ring on which light transmitting portions which transmit light emitted from the light emitting members through light transmitting portions and light intercepting portions which intercept the light emitted from the light emitting members are disposed alternately at a fixed distance; and said rotation limit section is a shutter configured to intercept the light emitted from the light emitting members at a position different from those of said light intercepting portions.

3. The lens barrel rotation detection apparatus according to claim 1, wherein said rotation detection means are three photo-couplers each including a light emitting member and a light receiving member;

said rotatable member is a rotation detection ring on which light transmitting portions which transmit light emitted from the light emitting members through light transmitting portions and light intercepting portions which intercept the light emitted from the light emitting members are disposed alternately at a fixed distance;

said rotation limit section is a shutter which closes up some of the light transmitting portions to intercept the light emitted from the light emitting members;

a limit position of a range of rotation in one direction of said rotation detection ring is detected when the light receiving portion of a first one of the three photo-couplers is in a light receiving state and the light receiving portions of second and third ones of the three photo-couplers are in a no-light receiving state; and a limit position of the range of rotation in the other direction of said rotation detection ring is detected when the light receiving portion of the first photo-coupler is in a no-light receiving state and the light receiving portions of the second and third photo-couplers are in a light receiving state.

4. The lens barrel rotation detection apparatus according to claim 1, wherein
said rotation detection means are three photo-couplers each including a light emitting member and a light receiving member;
said rotatable member is a rotation detection ring on which light transmitting portions which transmit light emitted from the light emitting members through light transmitting portions and light intercepting portions which intercept the light emitted from the light emitting members are disposed alternately for each $\theta°$ with respect to the center of rotation;
said rotation limit section is a shutter which closes up some of the light transmitting portions to intercept the light emitted from the light emitting members;
first and second ones of the three photo-couplers are disposed at a distance of $(2\theta+(\theta/2))°$ with respect to the center of rotation of said rotation detection ring; and
the second and third ones of the three photo-couplers are disposed at a distance of $(2\theta-(\theta/2))°$ with respect to the center of rotation of said rotation detection ring.

5. A lens barrel rotation type image pickup apparatus, comprising:
a lens barrel having a lens for image pickup attached to the lens barrel;
a driving source configured to exert driving force for driving said lens barrel in a horizontal direction or a vertical direction; and
a lens barrel rotation detection apparatus configured to detect a rotational state of said lens barrel;
said lens barrel rotation detection apparatus including a single rotatable member rotatable together with rotation of said lens barrel and three rotation detection means configured to detect a rotational state of said rotatable member;
said rotatable member having a fixed pattern of indicia formed on said rotatable member so as to be detected by said rotation detection means and a rotation limit section indicative of limit positions of a range of rotation of said lens barrel; and
said rotation detection means being disposed for detection of presence or absence of rotation of said rotatable member and the limit positions of the range of rotation, said three rotation detection means detecting a first arrangement of said indicia when said rotatable member rotates in a first direction to a first limit position and a second arrangement of said indicia when said rotatable member rotates in an opposite direction to a second limit position, wherein said first and second arrangement of said indicia differ from each other.

* * * * *